United States Patent [19]

Putnam

[11] Patent Number: 4,940,197
[45] Date of Patent: Jul. 10, 1990

[54] AIRCRAFT UNDERCARRIAGE UNIT

[75] Inventor: Peter M. H. Putnam, Herts, United Kingdom

[73] Assignee: British Aerospace Public Limited Company, London, England

[21] Appl. No.: 308,712

[22] Filed: Feb. 10, 1989

[30] Foreign Application Priority Data

Feb. 11, 1988 [GB] United Kingdom ............... 8803134

[51] Int. Cl.⁵ ............................................. B64C 25/10
[52] U.S. Cl. ............................................. 244/102 R
[58] Field of Search ........................ 244/102 R, 102 SS

[56] References Cited

U.S. PATENT DOCUMENTS

| | | | |
|---|---|---|---|
| 2,735,634 | 2/1956 | Fosness | 244/102 SS |
| 3,162,403 | 12/1964 | Hoke | 244/102 SL |
| 3,653,613 | 4/1972 | Palmer et al. | |
| 4,359,199 | 11/1982 | Kramer et al. | 244/100 R |

FOREIGN PATENT DOCUMENTS

| | | | |
|---|---|---|---|
| 0246949 | 11/1987 | European Pat. Off. | 244/102 R |
| 0295174 | 12/1988 | European Pat. Off. | 244/102 R |
| 0328395 | 8/1989 | European Pat Off. | |
| 1412645 | 10/1964 | France. | |
| 1006522 | 10/1965 | United Kingdom. | |
| 1510554 | 5/1978 | United Kingdom. | |
| 2101542 | 1/1983 | United Kingdom | 244/100 R |

Primary Examiner—Charles T. Jordan
Assistant Examiner—Richard W. Wendtland
Attorney, Agent, or Firm—Cushman, Darby & Cushman

[57] ABSTRACT

An aircraft undercarriage unit adaptable for long body or short body aircraft comprising a main leg including extendable oleopneumatic shock-absorbing means which pivotally carries at its lower end a bogie beam on which are mounted forward and rearward pairs of wheels and torque links interconnecting the forward end of the bogie beam and the main leg. The torque links include locking means whereby they are adaptable to form a tie bar, effectively forming a fulcrum. By this arrangement as the loads on the undercarriage are reduced at the end of a take-off run, extension of the oleopneumatic shock absorbing means will cause the bogie beam to tilt about the locked torque links, thereby effectively lengthening the undercarriage and increasing the maximum possible rotation angle of the aircraft.

5 Claims, 3 Drawing Sheets

AIRCRAFT UNDERCARRIAGE UNIT

This invention relates to aircraft undercarriages which are readily adaptable in configuration by which means they may be commonly used for aircraft having different fuselage lengths.

As outlined in British Patent Application No. GB2,101,542A, in a conventional aircraft, as the aircraft proceeds along a take-off run, the speed of the aircraft is increased by the thrust generated by its power plant. As the indicated air speed of the aircraft increases, so the portion of the mass of the aircraft borne aerodynamically increases and hence the load on the undercarriage decreases. The final part of the aerodynamic lift required to lift the aircraft clear of the ground is generated by rotation of the aircraft about its main undercarriage wheels (ie raising its nose) thereby increasing the angle of wing incidence. One of the determining factors in this take-off sequence is the maximum possible angle through which the aircraft can be rotated about its undercarriage wheels without a rear under-portion of the fuselage contacting the ground. This is to a significant degree dependent on the length of the main undercarriage and the length of the fuselage to the rear of that undercarriage.

An aircraft having a relatively long fuselage may be penalised in terms of take-off field length if it is not able to achieve a particular angle of rotation about its main undercarriage wheels. This may be achieved by installing an undercarriage of increased length over that which would be necessary with an aircraft having a shorter fuselage. This is an undesirable arrangement for a number of reasons:

(a) it would necessitate a corresponding increase in the installed leg length of the nose undercarriage in order to maintain the fuselage at 1° to the horizontal statically;

(b) the resultant clearance between the ground and the fuselage may be excessive in terms of ground loading capability;

(c) longer undercarriages would require increased stowage space within the aircraft which may be impracticable; and, (d) there would be an associated increase in installed weight and induced drag which would be undesirable.

British Patent Application No. GB2,101,542 teaches one solution to these problems whereby an undercarriage unit comprises a main leg which pivotally carries at its lower end a bogie beam on which are mounted forward and rearward pairs of wheels. A variable length oleopneumatic strut acts between the leg and a rearward portion of the bogie beam whose compression characteristics are selected so that when the loading on the strut and leg are reduced as the aircraft approaches rotational speed at the end of the take-off run, the strut extends thereby effectively lengthening the undercarriage and thus increasing the maximum possible rotation angle of the aircraft. However, this arrangement's dependence on oleopneumatic struts, whilst achieving the desired results, may be complex and costly in weight terms, for example.

European Patent Application EP87401042.4 (Publication No. 0246949) discloses a further undercarriage arrangement employing a tiltable bogie beam having a pivotal attachment at a fixed lug on the leg body at a position well forward of the bogie beam mid-point, tilting the bogie beam about that attachment point effected by an extendable plunger rod and a load transmitting piston assembly having an effective pivotal attachment at the mid-point of the bogie beam.

According to the present invention, there is provided an aircraft undercarriage unit including leg means, bogie means, torque link means, at least one ground engaging wheel means and bogie tilt means, said leg means including extendable oleopneumatic shock absorbing means and pivotal attachment means for attachment to an aircraft, said bogie means coupled to said shock absorbing means for tilting movement with respect to said leg means, said torque link means including interconnected first and second link means, said first link means pivotally attached to said leg means and said second link means pivotally attached to said bogie means, the or each ground engaging wheel means being mounted on said bogie means remote from the coupling thereof to said shock absorbing means, characterised in that said torque link means includes locking means for locking said first and said second link means together to form a rigid tie bar and said bogie tilt means whereby said bogie means will tilt about the locked torque link means in response to extension of said shock absorbing means so that the or a ground engaging wheel may be located at an increased distance from the aircraft attachment means when the loading on the undercarriage unit is decreased.

One embodiment of this invention will now be described, by way of example only, and with reference to the accompanying drawings in which.

Figure 1:
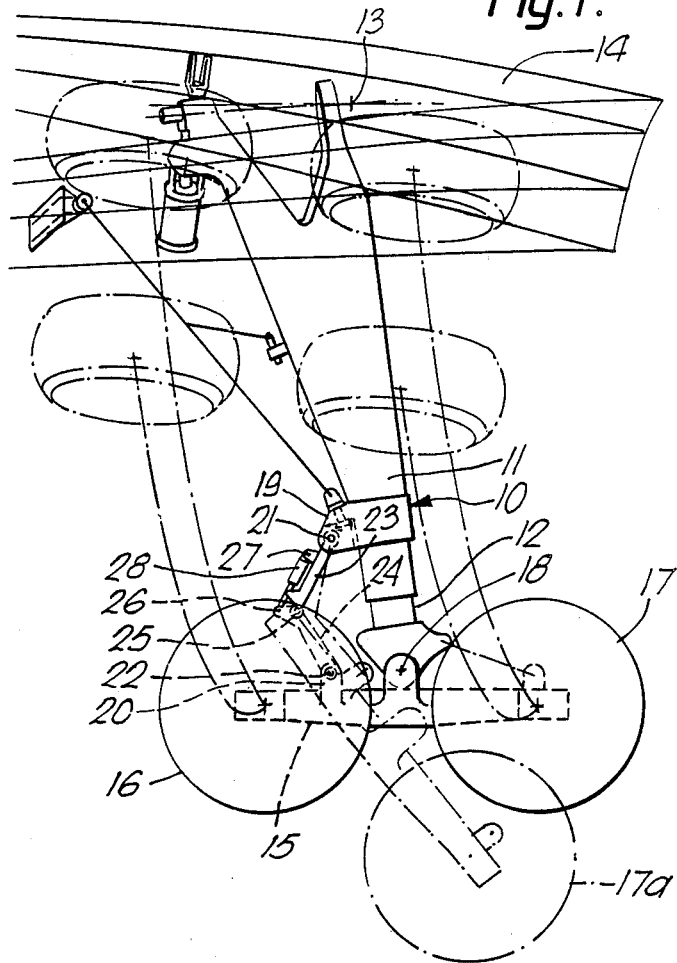
FIG. 1 is a side view of one embodiment of the undercarriage unit of this invention.

Referring to FIG. 1 an undercarriage unit 10 of this invention comprises a conventional form of main leg 11 housing an oleopneumatic shock absorber 12 and is pivotally mounted at 13 to the aircraft structure 14 for pivotal retraction movement with respect to the aircraft body. At its lower end the oleo 12 pivotally carries a bogie beam 15 on which are mounted forward and rearward pairs of wheels 16 and 17 respectively. In this embodiment the pivotal attachment 18 of the bogie beam 15 lies at about the mid-point between the forward and rearward wheel 16 and 17 respectively.

The lower portion of the main leg 11 is formed with a lug 19 and the forward portion of the bogie beam 15 is formed with a lug 20 which respectively provide pivotal attachment 21 and 22 to a pair of torque links 23 and 24 which intersect and are pivotally interconnected at 25. The lower torque link 24 incorporates a diagonally disposed lug 26 and the upper torque link 23 a lug 27 respectively providing attachments for a bogie attitude pitch trimmer 28 whose function will be later described.

Figure 3:
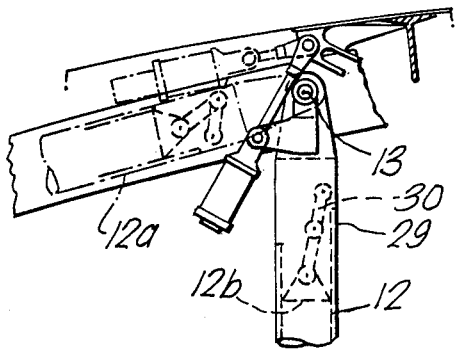
FIG. 3 is a local view at the top of the main undercarriage leg in direction of arrow III in FIG. 1.

The oleopneumatic shock absorber 12 is generally of well-known conventional form and will not be described in detail here since the principles of 'oleo' design are well established in the conventional type undercarriages as fitted to modern day aircraft. However, as earlier discussed there is a need for a main gear which can absorb the differences between the various fuselage lengths and yet provide static conditions acceptable to the airlines particularly for general ground handling. The object of the present invention is to achieve an effective extension of the mainleg as a function of oleo extension. One embodiment for achieving such an extension is illustrated by reference to FIG. 3. The oleopneumatic shock absorber 12 which is sealingly and slidably moveable within the outer casing 29 of the mainleg incorporates at its upward extremity pivotal attachment to linkage system 30 by which means the oleo is moveable within its outer casing 29 from its static position 12a, as illustrated with the undercarriage retracted into the wing and its fully extended position 12b which it will achieve when the undercarriage is lowered in preparation for landing or in the take-off mode as the mass of aircraft is borne aerodynamically and the load on the undercarriage decreases.

The significance of this extension to the operation of this embodiment will now be described. When the aircraft is in a static position the bogie beam will be as illustrated in FIG. 1, lying substantially horizontal with the axle loads on the front and rear wheels being substantially equal. As the aircraft proceeds along its take-off run the loading on the undercarriage unit will decrease as aerodynamic lift increases. The operation must be such that the lift on the aircraft and load on the aircraft are in equilibrium during the take-off. In the long body arrangement to achieve this condition the rear pair of wheels 17 must be the last point of contact at take off.

Figure 2:
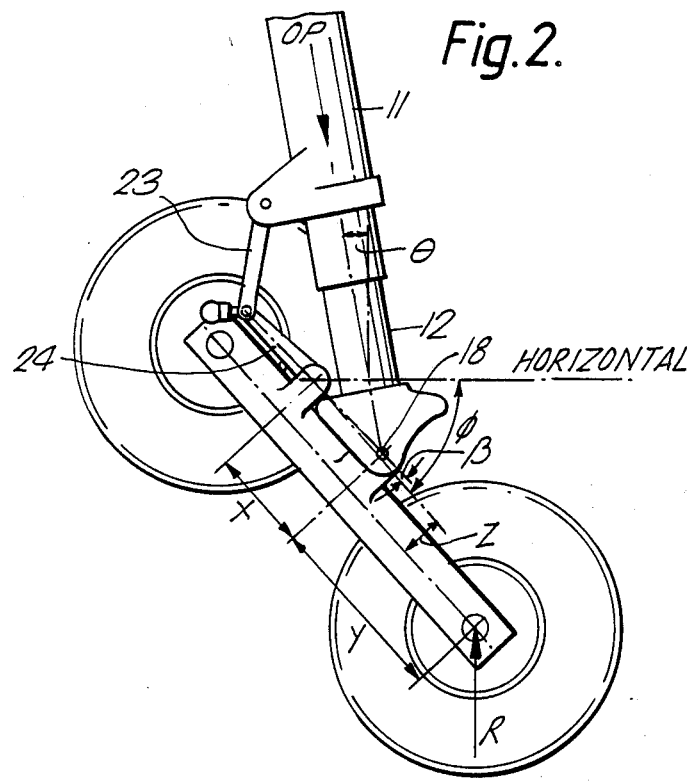
FIG. 2 is a diagrammatic partial side elevation illustrating the bogie tilting arrangement of this invention.

In operation, as further illustrated in FIG. 2, as the load on the undercarriage main leg 11 decreases to a percentage of the original static load, and the torque links 23 and 24 are locked by the bogie attitude pitch trimmer 28, an hydraulically activated spring strut the oleo 12 will extend causing the bogie beam 15 to tilt in a clockwise sense, as viewed in FIG. 1 to place the rear wheels 17 in the position 17a. This effectively increases the leg length and provides the point of rotation for the long bodied aircraft. This is a simple mechanical arrangement in which the locked torque links 23 and 24 act as a tie providing the necessary mechanical means to swing the bogie into its rocked position as a function of oleo extension.

FIG. 2 illustrates more clearly the geometrical arrangement of the landing gear in extended configuration and how the reactions are balanced around the bogie pivot 18 as defined by the expression:

$$OP = \frac{R((X+Y)\cos\phi - Z\sin\phi}{\frac{X}{\cos\beta}\cos(\phi + \theta\beta)}$$

where OP is the oleo pressure. Being diagrammatic the mechanical arrangement of the torque links and their locking means vary slightly from the arrangement of FIG. 1 but are identical in function.

Figure 4:
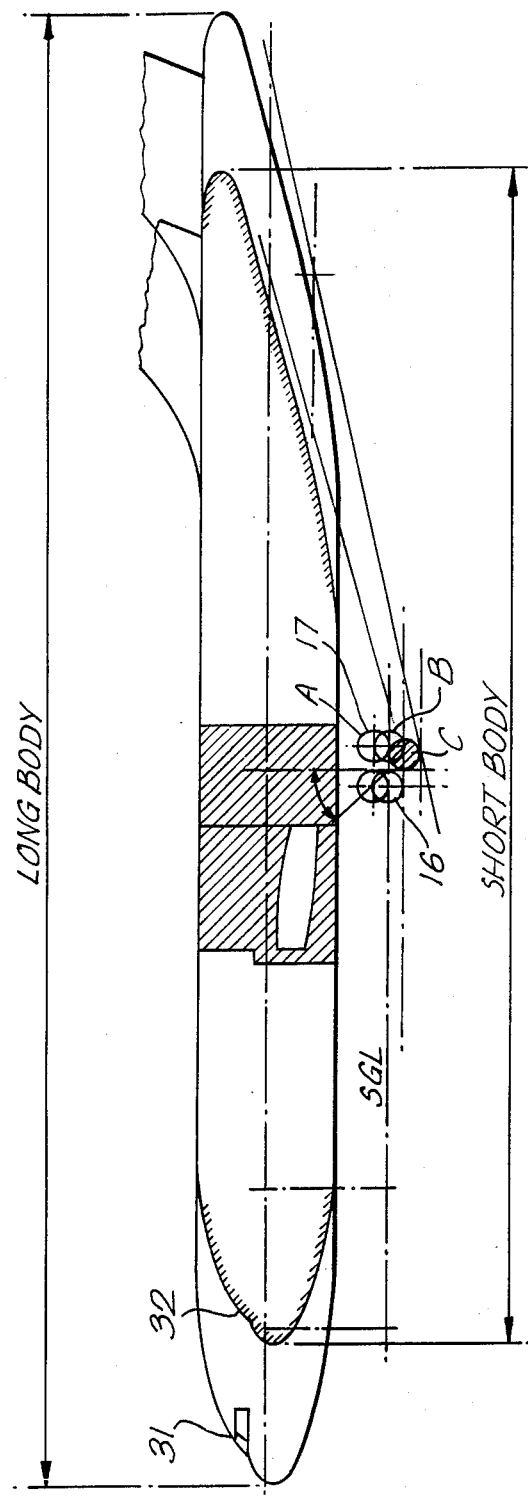
FIG. 4 is a diagrammatic view of a long and a short bodied aircraft incorporating an undercarriage unit of this invention; and, FIG. 5 graphically illustrates the primary law governing oleo characteristics.

As previously stated, one important feature of this embodiment is that it enables a common undercarriage unit to be designed for both a long and a short bodied aircraft. Referring to FIG. 4 there are shown a long and short bodied aircraft 31 and 32 respectively, each of which includes as main undercarriage units the embodiment of undercarriage unit 10 shown in FIG. 1. The separation of the wheels 16 and 17 from the fuselage when the aircraft is in a static position, is determined by the minimum possible ground clearance between the engines (not shown) of the long bodied aircraft and the ground and is set by suitable dimensioning of leg 11 and suitable damping characteristics of oleo 12.

The extension of the oleo 12 and its damping characteristics together with the geometry of the torque link arrangement 23/24, and its associated hydraulically activated attitude pitch trimmer are so selected that when the long bodied aircraft approaches the end of a take-off run the bogie 15 as a function of oleo extension rotates about the locked torque links to give a maximum rotation angle of the long bodied aircraft.

The positions of the rearward wheels at 1 g static condition and rotation for the short and long bodied aircraft are shown at 'A', 'B' and 'C' respectively on FIG. 4, 'C' being specifically the case to which the present invention is applicable.

Figure 5:
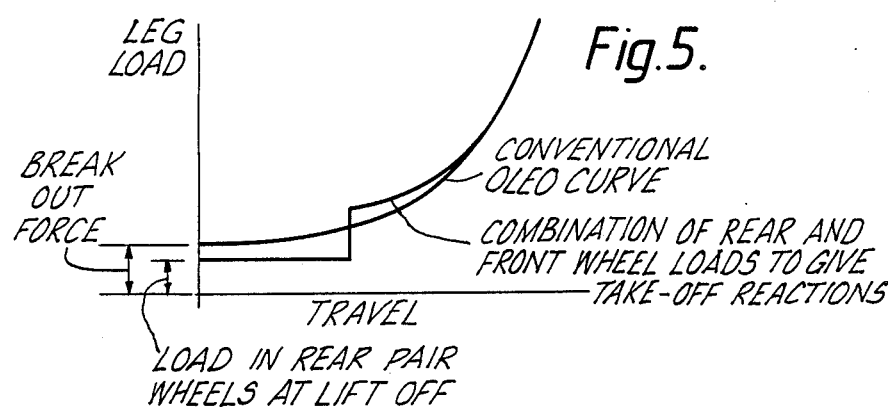

Referring to FIG. 5, in order to achieve the desired Vmu (minimum unstick speed) characteristics, the primary characteristics of the oleo must follow the arranged leg load against vertical displacement curve as shown in FIG. 5.

Although described in the context of an undercarriage having a bogie beam with forward and rearward wheel pairs, the invention may be equally applicable to arrangements in which the bogie beam is provided with a rearward pair of wheels only.

I claim:

1. An aircraft undercarriage unit including leg means, bogie means, torque link means, at least one ground engaging wheel means and bogie tilt means, said leg means including extendable oleopneumatic shock absorbing means and pivotal attachment means for attachment to an aircraft, said bogie means coupled to said shock absorbing means for tilting movement with respect to said leg means, said torque link means including interconnected first and second link means, said first link means pivotally attached to said leg means and said second link means pivotally attached to said bogie means, the or each ground engaging wheel means being mounted on said bogie means remote from the coupling thereof to said shock absorbing means, characterised in that said torque link means including locking means for locking said first and said second link means together to form a rigid tie bar and said bogie tilt means whereby said bogie means will tilt about the locked torque link means in response to extension of said shock absorbing means so that the or a ground engaging wheel may be located at an increased distance from the aircraft attachment means when the loading on the undercarriage unit is decreased.

2. An aircraft undercarriage unit according to claim 1 in which said torque link locking means comprises an hydraulically activated spring strut.

3. An aircraft undercarriage unit as claimed in claim 1 wherein said second torque link means is pivotally located to said bogie means forwardly of the coupling thereof to said shock absorbing means.

4. An aircraft undercarriage unit as claimed in any of the preceding claims wherein the bogie means includes forward and rearward ground engaging wheel means spaced by a given distance and the coupling of the bogie means to the shock absorbing means is spaced substantially at the mid point between said forward and rearward ground engaging wheels.

5. An aircraft undercarriage unit as claimed in any of claims 1–3 wherein the bogie means includes a trailing set of ground engaging wheels located near its rearward end and a pivotal attachment to said second torque link means near its forward end but forwardly of its coupling with said shock absorbing means.

* * * * *